(12) United States Patent
Essig

(10) Patent No.: US 8,356,479 B2
(45) Date of Patent: Jan. 22, 2013

(54) HYDROSTATIC TRAVEL DRIVE HAVING TWO HYDRAULIC MOTORS

(75) Inventor: Heinz-Gerhard Essig, Lonsee (DE)

(73) Assignee: Robert Bosch GmbH, Stuttgart (DE)

( * ) Notice: Subject to any disclaimer, the term of this patent is extended or adjusted under 35 U.S.C. 154(b) by 940 days.

(21) Appl. No.: 12/447,280

(22) PCT Filed: Nov. 15, 2007

(86) PCT No.: PCT/EP2007/009884
§ 371 (c)(1),
(2), (4) Date: Apr. 27, 2009

(87) PCT Pub. No.: WO2008/058739
PCT Pub. Date: May 22, 2008

(65) Prior Publication Data
US 2010/0050624 A1    Mar. 4, 2010

(30) Foreign Application Priority Data

Nov. 15, 2006    (DE) .......................... 10 2006 053 925

(51) Int. Cl.
*B60K 17/10*    (2006.01)
*F16H 39/02*    (2006.01)
(52) U.S. Cl. ............................. 60/468; 60/484; 60/490
(58) Field of Classification Search .................... 60/420, 60/427, 468, 484, 490
See application file for complete search history.

(56) References Cited

U.S. PATENT DOCUMENTS

| 4,554,991 A | * | 11/1985 | Eden ............................. 180/243 |
| 4,766,727 A | * | 8/1988 | Dull et al. ...................... 60/427 |
| 5,489,007 A | * | 2/1996 | Yesel ............................ 180/243 |
| 2005/0109026 A1 | * | 5/2005 | Bigo et al. ...................... 60/468 |
| 2006/0076067 A1 | * | 4/2006 | McInerney et al. ...... 137/625.64 |

FOREIGN PATENT DOCUMENTS

| DE | 25 28 735 | | 6/1975 |
| DE | 34 31 683 A1 | | 3/1986 |
| DE | 3431683 A1 | * | 3/1986 |
| DE | 196 48 706 C2 | | 6/1998 |
| DE | 199 39 474 A1 | | 3/2001 |
| DE | 10 2004 061 558 A1 | | 7/2006 |
| EP | 1 647 720 A1 | | 4/2006 |
| FR | 2 254 987 | | 7/1975 |

* cited by examiner

*Primary Examiner* — Thomas E Lazo
(74) *Attorney, Agent, or Firm* — Scully, Scott, Murphy & Presser, P.C.

(57) ABSTRACT

The invention relates to a hydrostatic drive having one hydraulic pump unit (3) and at least one first hydraulic motor unit (14) and a second hydraulic motor unit (15). The first hydraulic motor unit (14) and the second hydraulic motor unit (15) are connected in parallel with the hydraulic pump unit (3) in a hydraulic circuit. A flow divider (80) is provided between the two hydraulic motor units (14, 15) and the hydraulic pump unit (3). The first working line (7) connecting the flow divider (80) with the hydraulic pump unit (3) is connected to a pressure control valve (23).

9 Claims, 1 Drawing Sheet

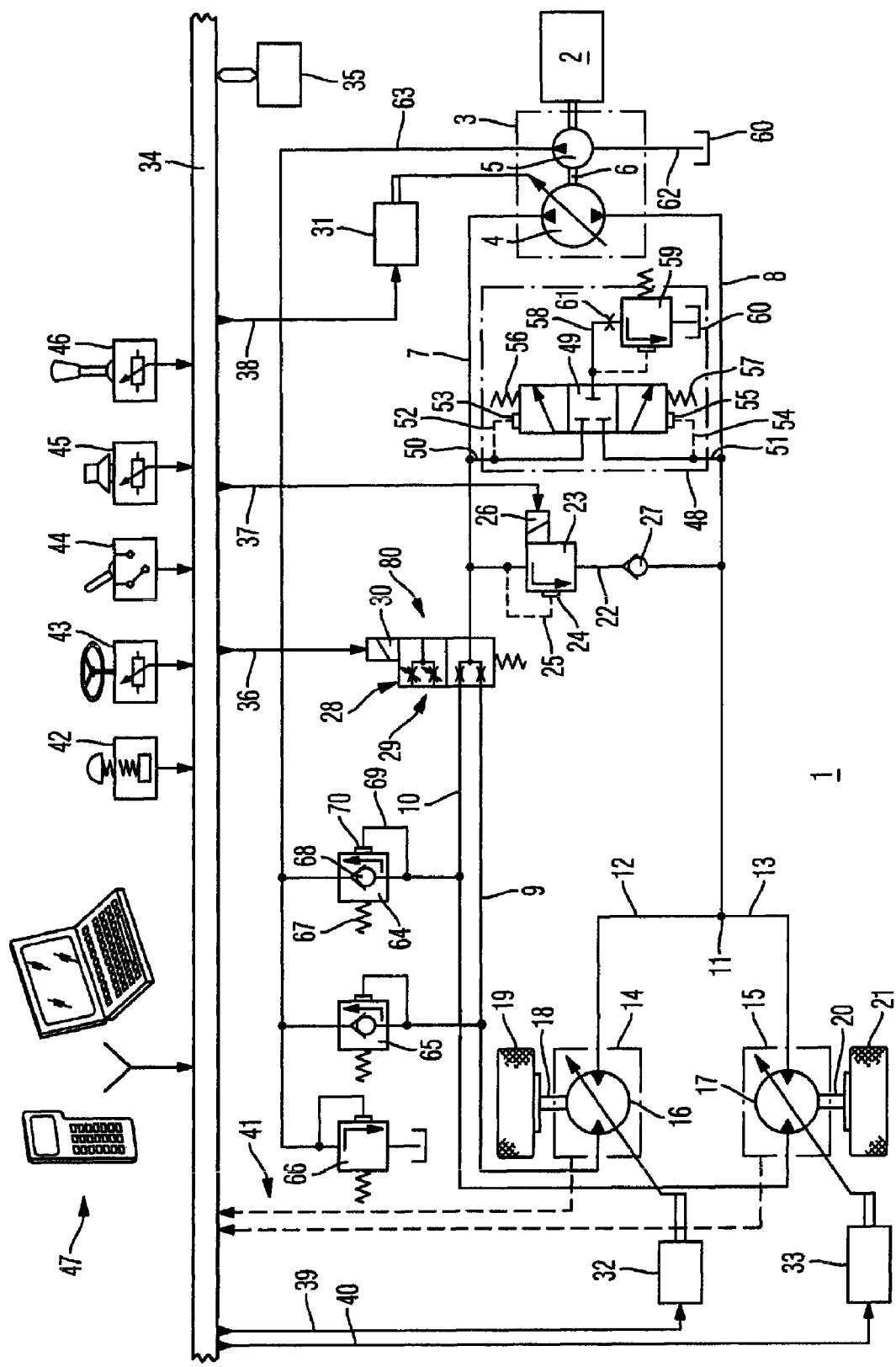

HYDROSTATIC TRAVEL DRIVE HAVING TWO HYDRAULIC MOTORS

The invention relates to a hydrostatic travel drive having a hydraulic pump and two hydraulic motors in a hydraulic circuit.

In hydrostatic travel drives for driving commercial vehicles, it is known to connect a first and second hydraulic motor to a hydraulic pump in a closed hydraulic circuit. The first and second hydraulic motors are connected in parallel to the hydraulic pump. Such a drive is known from DE 199 39 474 A1. In this case, the hydraulic pump is connected to a first working line and a second working line. The first working line branches, at a flow divider, into a first motor working line and a second motor working line. The second motor working line, which is likewise connected to the hydraulic pump, branches into a third motor working line and a fourth motor working line.

If the vehicle goes into an overrun condition, pressure medium is delivered by the two hydraulic motors in the closed hydraulic circuit while maintaining the flow direction. The two hydraulic motors, which now act as pumps, are supported, via the hydraulic pump, on a driving engine connected to the hydraulic pump. The braking torque thus produced is in this case dependent on the maximum available braking torque on the part of the driving engine. In order not to overload the driving engine, which is generally embodied as a diesel internal combustion engine, the delivery volumes and absorbing volumes of the hydrostatic piston machines are set such that the braking effect is limited. An additional braking effect is only possible by providing a service brake.

It is therefore the object of the invention to provide a hydrostatic drive having a hydraulic pump and at least two hydraulic motors, in which the hydraulic braking effect is not restricted to the braking power of the driving engine.

The object is achieved by the hydrostatic travel drive according to the invention having the features of claim 1.

In the case of the hydrostatic travel drive according to the invention, a hydraulic pump is connected to at least one first hydraulic motor and one second hydraulic motor in a hydraulic circuit. The first hydraulic motor and the second hydraulic motor are connected in parallel to the hydraulic pump in the closed hydraulic circuit. A flow divider is arranged between the hydraulic motors and the hydraulic pump. According to the invention, a pressure limiting valve is arranged in a first working line, which connects the flow divider to the hydraulic pump. As a result of this pressure limiting valve, a pressure arising in the first working line in overrun condition of the vehicle is relieved while producing heat. The volume flow supplied to the pump is thus reduced, so that consequently the power consumption on the part of the driving engine is also reduced. Accordingly, a lower braking power has to be generated by the driving engine or, conversely, the total braking effect is increased by the division of the volume flow by the pressure limiting valve. The released kinetic energy is in this case converted into heat.

Advantageous developments of the hydrostatic travel drive according to the invention are set out in the subclaims.

In particular, it is advantageous to arrange the pressure limiting valve in a short-circuit line, which connects the first to the second working line. The arrangement in such a short-circuit line has the advantage that the volume flow branched off from the working line is supplied to the suction side of the hydraulic pump again. Thus, the entire volume flow delivered by the two hydraulic motors is divided into a volume flow which is supplied to the hydraulic pump and into a volume flow which is led past the hydraulic pump to the input side of the hydraulic motors. Thus, redelivery of pressure medium can be dispensed with, as would be necessary for example if the pressure medium relieved via the pressure limiting valve to produce the braking effect had been led away to a tank volume.

Furthermore, it is advantageous to provide a nonreturn valve between the pressure limiting valve and the second working line, which nonreturn valve opens in the direction of the second working line. Such a nonreturn valve has the advantage that, in the case of normal driving, where the delivery pressure of the hydraulic pump is present in the second working line, the pressure limiting valve is not acted upon by this delivery pressure.

The flow divider preferably connects the first working line branch and the second working line branch to the first working line in each case via one controllable throttling point. Thus, it is additionally possible, through the braking effect which is produced by the pressure limiting valve, to produce an additional braking effect directly by the flow divider. For this purpose, the flow divider can be acted upon by a first control signal, so that the throttling effect of the flow divider is adjustable in dependence on this first control signal. The first control signal is preferably produced by an electronic control unit. In this case, the electronic control unit takes into account, for example, a brake pedal position or a brake pedal force.

Furthermore, it is preferable if the opening pressure of the pressure limiting valve is adjustable in dependence on a second control signal. Thus, no fixed setting of the pressure limiting valve for producing the additional braking effect at the pressure limiting valve is provided. Depending on the operating situation present in each particular case, the braking effect can therefore be adapted to match the situation by relieving pressure medium by means of the pressure limiting valve. The braking effect can thus be reduced, for example, in the event of excessive development of heat at the throttle valve and the associated undesired heating of the pressure medium. The distribution of the volume flow via the hydraulic pump or the pressure limiting valve can thus be adjusted.

The hydraulic pump is preferably adjustable in its delivery volume, the delivery volume being adjustable in the direction of a minimum delivery volume in dependence on a braking signal. The hydraulic pump in combination with the driving engine produces a higher braking torque, the lower the delivery volume of the hydraulic pump is set. Accordingly, the braking effect can be increased by adjusting the delivery volume, during a braking procedure with an increasing braking signal, in the direction of the minimum delivery volume.

The delivery volume of the hydraulic pump is in this case adjustable by an adjusting device which is controllable by an electronic control device.

Preferably, the first hydraulic motor and the second hydraulic motor are also adjustable in their absorbing volume. For this purpose, a first motor adjusting device cooperates with the first hydraulic motor and a second motor adjusting device cooperates with the second hydraulic motor. The first motor adjusting device and the second motor adjusting device are likewise preferably controllable by an electronic control device. In this case, the absorbing volume of the two hydraulic motors is adjusted, in particular with an increasing braking signal, i.e. increasing desire for deceleration, in the direction of greater absorbing volumes. The hydraulic motors acting as hydraulic pumps thus deliver an increasingly greater volume flow at a constant vehicle speed.

Preferably, a purge device is arranged between the connection of the pressure limiting valve to the first working line and the pump. Consequently, from the volume flow which has already been reduced, a further partial volume flow is withdrawn with the aid of the purge device, so that the volume flow supplied to the hydraulic pump is reduced still further in the event of deceleration, without influencing the braking power achieved by the pressure limiting valve.

A preferred exemplary embodiment is illustrated in simplified form in the drawing and is explained in more detail in the following description, in which:

FIG. 1 shows a hydraulic circuit diagram of a hydrostatic travel drive according to the invention.

A hydrostatic travel drive according to the invention is illustrated in FIG. 1. The hydrostatic travel drive 1 comprises, as the primary drive source, a driving engine 2, which is generally embodied as a diesel internal combustion engine. The driving engine 2 is connected to a hydraulic pump unit 3.

The hydraulic pump unit 3 comprises a hydraulic pump 4 and a feed pump 5. The hydraulic pump 4 and the feed pump 5 are coupled to one another and to the driving engine 2 via a drive shaft 6. The hydraulic pump 4 is a hydraulic pump which is designed for delivery in two directions and is adjustable in its delivery volume. The feed pump 5 is embodied as a fixed displacement pump and is provided for delivery in one direction only.

The pressure medium delivered by the hydraulic pump 4 is delivered to a first working line 7 or to a second working line 8 in dependence on the respective delivery direction. The first working line 7 branches at a flow divider 80 into a first motor working line 9 and a second motor working line 10. The second working line 8 branches at a branching point 11 into a third motor working line 12 and a fourth motor working line 13.

The first motor working line 9 and the third motor working line 12 are connected to a first hydraulic motor unit 14. Correspondingly, the second motor working line 10 and the fourth motor working line 13 are connected to a second hydraulic motor unit 15. The first hydraulic motor unit 14 comprises a hydraulic motor 16 which is adjustable with respect to its absorbing volume. Correspondingly, the second hydraulic motor unit 15 comprises a second hydraulic motor 17 which is likewise adjustable with respect to its absorbing volume.

The first hydraulic motor 16 is connected to a first driven wheel 19 via a first driven shaft 18. In a corresponding manner, the second hydraulic motor 17 is connected to a second driven wheel 21 via a second driven shaft 20. The first driven wheel 19 and the second driven wheel 21 may be associated, for example, with in each case one vehicle side of the same vehicle axle.

The first working line 7 and the second working line 8 are connected to one another via a short-circuit line 22. A pressure limiting valve 23 is arranged in the short-circuit line 22. The pressure prevailing in the first working line 7 acts on the pressure limiting valve 23 at a first measuring surface 24. This pressure prevailing in the working line 7 is supplied to the first measuring surface 24 via a first measuring line 25. The hydraulic force which is produced at the first measuring surface 24 urges the pressure limiting valve 23 in the direction of its open position. In the open position of the pressure limiting valve 23, a throughflow-enabling connection of the first working line 7 to the second working line 8 is established by the short-circuit line 22. In contrast, if the hydraulic force produced at the measuring surface 24 is not sufficient to move the pressure limiting valve 23 into its open position, the short-circuit line 22 is interrupted by the pressure limiting valve 23.

In the exemplary embodiment illustrated, the opening pressure is set solely with the aid of an electromagnet 26. The electromagnet 26 is preferably embodied as a proportional magnet, so that the opening pressure of the pressure limiting valve 23 can be set in accordance with a supplied current. During forward travel, pressure medium is delivered to the second working line 8 by the hydraulic pump 4. The pressure medium delivered to the second working line 8 divides into the third motor working line 12 and the fourth motor working line 13. With reduction of the delivery pressure, an output torque is produced at the driven shafts 18, 20 by the hydraulic motors 16, 17. The now almost unpressurised pressure medium during normal driving flows to the flow divider 80 via the first motor working line 9 and the second motor working line 10. The flow divider 80 is in this case arranged downstream of the hydraulic motors 16, 17. The flow divider 80 acts here as an adder and adds up the two volume flows of the first motor working line 9 and of the second motor working line 10. This added-up volume flow is passed on to the first working line 7 and flows there in the direction of the hydraulic pump 4.

If a vehicle driven in such a manner during forward travel now goes into overrun condition or a deceleration is selected by the operator, the pressure conditions in the lines reverse. The first working line 7 is thus pressurised with pressure medium via the flow divider 80 and the first motor working line 9 and the second motor working line 10. This pressure medium is delivered by the first hydraulic pump 16 and the second hydraulic pump 17, which now act as pumps on account of the mass inertia of the vehicle. The pressure increase leads to an increased hydraulic force at the first measuring surface 24 of the pressure limiting valve 23. If the force thus produced, which only occurs during in overrun condition or during a braking procedure, exceeds the opening pressure set by the electromagnet 26, the pressure limiting valve 23 opens. Owing to the opening of the pressure limiting valve 23, a connection enabling a throttled throughflow in the short-circuit line 22 is established and a partial volume flow is withdrawn from the first working line 7 and supplied to the second working line 8.

In order to prevent, during normal driving in the forward direction, pressure medium, which is delivered to the second working line 8 by the hydraulic pump 4, from acting upon the pressure limiting valve 23, a nonreturn valve 27 is arranged in the short-circuit line 22. The nonreturn valve 27 is arranged between the pressure limiting valve 23 and the second working line 8 and opens in the direction of the second working line 8.

In the exemplary embodiment illustrated, the opening pressure of the pressure limiting valve 23 may be set by means of the electromagnet 26 embodied as a proportional magnet. Equally, however, the opening pressure of the pressure limiting valve 23 may also be set with the aid of a setting spring, so that the pressure limiting valve 23 opens in each case at a predetermined fixed opening pressure in the first working line 7.

In the exemplary embodiment illustrated, the flow divider 80 is embodied as a 3/2-way valve. The connections of the flow divider 80 to the first motor working line 9 and the second motor working line 10 have in each case one adjustable throttling point 28, 29. The throttling points 28, 29 are adjustable in dependence on a first control signal. The first control signal or a control current corresponding to the control signal is likewise supplied to an electromagnet 30, via which the flow divider 80 is actuated. Thus, in addition to the braking effect produced by the driving engine 2, and through the braking effect of the pressure limiting valve 23, a braking effect can also be produced in the flow divider 80 by throttling the volume flow through the flow divider 80.

To adjust the delivery volume of the hydraulic pump 4, an adjusting device 31 is provided. The adjusting device 31 cooperates with an adjusting mechanism of the hydraulic pump unit 3 which sets the delivery direction and the delivery quantity of the hydraulic pump 4.

In the exemplary embodiment illustrated, the two hydraulic motors 16, 17 are preferably also adjustable in their absorbing volume. For this purpose, a first motor adjusting device 32 and a second motor adjusting device 33 are provided, which act on the respective adjusting mechanisms of the hydraulic motor units 14 and 15.

To control the adjusting devices 31 and the motor adjusting devices 32 and 33, these devices are connected to a bus system 34. Also connected to the bus system 34 is an electronic control unit 35. The electronic control unit 35 produces a first control signal, which is supplied to the electromagnet 36 via a first control signal line 36. The electronic control unit 35 also produces a second control signal, which is supplied to the electromagnet 26 via the second control signal line 37. A third control signal is supplied to the adjusting device 31 via a third control signal line 38. A fourth and fifth control signal are likewise produced by the electronic control unit 35 and are supplied to the first motor adjusting device 32 and the second motor adjusting device 33, respectively, via a fourth and fifth control signal line 39, 40, respectively. The control lines 36 to 40 thus connect the electromagnets 26, 30 and also the adjusting device 31 and the motor adjusting device 32, 33 to the electronic control unit 35 by means of the bus system 34.

The electronic control unit 35 produces the control signals in dependence on operator inputs. To input a driving request, the operator selects, for example, a direction, an acceleration or driving-direction request via various control elements 42 to 46. The control elements comprise, for example, an emergency stop switch 42, a steering wheel 43, the position of which is electronically detected, a driving mode switch 34 and a driving lever 46. A further input device 45 is also illustrated by way of example.

Furthermore, actual data of the hydraulic motor unit 14 and 15 are transmitted to the electronic control unit 35 via the bus system 34. For this purpose, the hydraulic motor units 14 and 15 are connected to the bus system 34 via actual-signal lines 41. The actual-signal lines 41 serve, for example, to transmit rotational speed signals or operating temperatures of the hydraulic motor units 14, 15.

Starting from normal driving in the forward direction, where pressure medium is delivered to the second working line 8 by hydraulic pump 4, the deflection of the driving lever 46 is taken back by an operator, for example. If the taking-back of the driving lever 46 exceeds the deceleration of the vehicle on account of the internal friction, the vehicle is actively braked. On the basis of the change in position of the driving lever 46, a braking signal is determined and transmitted to the electronic control unit 35. A braking signal may, for example, also be produced by actuation of a foot pedal, for example a brake pedal, by a vehicle operator.

In dependence on the strength of the braking signal, the hydraulic pump 4 is now adjusted in the direction of decreasing delivery volume to decelerate the vehicle. At the same time, the two hydraulic motors 16 and 17 are preferably deflected in the direction of their maximum absorbing volume by the motor adjusting devices 32 and 33. Thus, on account of the mass inertia of the vehicle, a large volume flow is produced by the two hydraulic motors 16, 17 and delivered to the first motor working line 9 and the second motor working line 10, respectively. In the exemplary embodiment illustrated, in which both the pressure limiting valve 23 and the flow divider 80 are controllable, a first control signal and a second control signal are produced by the electronic control unit 35. The electromagnet 33 is acted upon by the first control signal, so that an adjusting force is produced on the flow divider 80. This adjusting force leads to an increase of the throttling action by the adjustable throttles 28 and 29. The 3/2-way valve is adjusted in the direction of its upper position, illustrated in FIG. 1, counter to the force of a restoring spring.

At the same time, the electromagnet 26 of the pressure limiting valve 23 is energised in accordance with the second control signal and thus a specific opening pressure of the pressure limiting valve 23 is set. The desired braking effect consequently results from the withdrawal of pressure medium from the first working line 7 and the relief via the pressure limiting valve 23, kinetic energy being converted into heat by the relieving of the pressure medium via the pressure limiting valve 23. Kinetic energy is likewise converted into heat at the two controllable throttling points 28 and 29 of the flow divider 80.

An additional braking effect is obtained by the hydraulic pump 4, which is acted upon by pressure medium via the first working line 7. The hydraulic pump 4, which has been adjusted to a smaller delivery volume in order to obtain a braking effect, is supported on the working engine 2.

Instead of the throttling effect at the flow divider 80 produced in the exemplary embodiment illustrated, a throttling effect may also be dispensed with there. The reduction of the braking torque to be generated by the driving engine 2 is then achieved only by the reduction of the volume partial flow, formed by the hydraulic pump 4, by the pressure limiting valve 23. In this case, too, either a variable setting of the opening pressure or a fixed setting may be provided with the aid of a spring.

Instead of the variable hydraulic motors 16, 17 used in the preferred exemplary embodiment illustrated, fixed displacement motors may also be employed. In this case, the adjustment of the hydraulic motors 16, 17 to their maximum delivery volume to achieve a particularly large braking effect does not apply.

By using the pressure limiting valve 23 as a brake valve, it is ensured that the pressure limiting valve 23 responds only when the pressure conditions reverse in the hydraulic circuit during forward travel. As long as there is normal forward travel, the first working line 7 is largely unpressurised and the pressure limiting valve 23 does not respond.

In the case of reverse travel, the opening pressure of the pressure limiting valve 23 must be set such that, during normal reverse driving, where the first working line 7 is pressurised by the hydraulic pump 4, the working line pressure lies below the opening pressure. In the case of a variable setting of the opening pressure of the pressure limiting valve 23, this can be ensured by a corresponding second control signal. Consequently, the electromagnet 26 is set such that a high opening pressure of the pressure limiting valve 23 is set.

For the settings and characteristic curves for controlling the flow divider 80, the pressure limiting valve 23 and the adjusting devices 31 to 33, access may be had via the bus system 34 by means of service equipment 47 to the electronic control unit 35. It is also possible to read out any error messages from an error memory via the service equipment 47.

Both during normal driving and, in particular, during the braking procedure, the pressure medium in the closed hydraulic circuit is heated. In order to avoid overheating of the pressure medium, pressure medium is intentionally withdrawn from the closed hydraulic circuit. This pressure medium may, for example, be led away to an external tank volume via a cooler.

For this purpose, a purge device 48 is provided. The purge device 48 has a purge valve 49 which is embodied as a 3/3-way valve. The purge valve 49 has two inlet connections. The first inlet connection is connected to the first working line 7 via a first withdrawal line 50. The second inlet connection is connected to the second working line 8 via a second withdrawal line 51. The pressure prevailing in the first working line 7 is supplied to a first measuring surface 53 via a first comparison line 52. Correspondingly, the pressure of the second working line 8 is supplied to a second, oppositely acting, measuring surface 55 via a second comparison line 54. Furthermore, the purge valve 49 is retained in its central position, illustrated in FIG. 1, by a first centring spring 54 and a second centring spring 57. In the central position, the two inlet connections and an outlet connection of the purge valve 49 are disconnected from one another. The purge valve 49 is connected to those sections of the working lines 7, 8 which lie between the short-circuit line 22 and the hydraulic pump 4.

On account of a pressure difference resulting in the working lines 7, 8, the purge valve 49 is deflected, starting from its central position, in the direction of a first or second end position. If the pressure, as is customary during normal forward travel, is greater in the second working line 8 than in the first working line 7, the hydraulic force at the second measuring surface 55 exceeds the hydraulic force at the oppositely acting first measuring surface 53.

The purge valve 49 is thereby deflected into a first end position. In the first end position, the first withdrawal line 50 is connected to a purge line 58. The purge line 58 connects the outlet connection of the purge valve 49 to a tank volume 60. In the purge line 58 there is provided a pressure maintaining valve 59 which ensures that no withdrawal of purge oil takes place below a certain minimum pressure. Arranged upstream of the maintaining valve 59 is a throttling point 61 which serves to limit the quantity of purge medium withdrawn. The maintaining valve 59 is a spring-loaded pressure limiting valve, the pressure, which prevails in the purge line 58 upstream of the throttling point 61, acting on a maintaining valve measuring surface which acts counter to the spring.

Upon a reversal of pressure in the first working line 7 and the second working line 8, the force conditions at the first and second measuring surfaces 53 and 54 reverse. Consequently, the force at the first measuring surface 53 exceeds the force at the second measuring surface 55. The purge valve 49 is moved to its second end position, in which the second withdrawal line 51 is connected to the purge line 58.

To redeliver pressure medium withdrawn from the hydraulic circuit, a feed device is provided. The feed device comprises the feed pump 5 which sucks in pressure medium from the tank volume 60 via a suction line 62. The sucked-in pressure medium is delivered to a feed pressure line 63 by the feed pump 5. The feed pressure line 63 is connected to the first motor working line 9 via a first feed valve device 65. Similarly, the feed pressure line 63 is connected to the second motor working line 10 via a second feed valve unit 64. To produce a constant feed pressure above a minimum rotational speed of the feed pump 5 embodied as a fixed displacement pump, a feed pressure limiting valve 66 is provided. The feed pressure limiting valve 66 opens from a specific, fixed feed pressure in the feed pressure line 63 and relieves the feed pressure line 63 to the tank volume 60.

The first feed valve unit 65 and the second feed valve unit 64 are identically constructed. To avoid unnecessary repetitions, only the construction of the second feed valve unit 64 is therefore explained in more detail below.

The feed pressure line 63 is connected to the second motor working line 10 via the second feed valve unit 64. In this case, the second feed valve unit 64 has a nonreturn valve 68 which opens in the direction of the second motor working line 10. If the pressure in the feed pressure line 63 exceeds the pressure in the second motor working line 10, the nonreturn valve opens and pressure medium is supplied from the feed pressure line 63 to the motor working line 10. In contrast, if a higher pressure is present in the second motor working line 10, the nonreturn valve 68 goes into its closed position. An unintended loss of pressure medium from the motor working line 10 to the feed system is thus prevented. The feed valve unit 64 furthermore has an integrated pressure limiting valve which is retained in its closed position on account of a feed valve spring. Acting counter to the force of the feed valve spring 67 is a hydraulic force which acts on a feed valve measuring surface 70. The hydraulic force on the feed valve measuring surface 70 is produced by a pressure in the second motor working line 10. For this purpose, the feed valve measuring surface 70 is connected to the second motor working line 10 via a feed valve measuring line 69. The second motor working line 10 can thus be protected by means of the feed valve spring 67. The second feed valve spring 67 defines the opening pressure of the feed valve unit 64. If the pressure in the second motor working line 10 exceeds the set critical value, the second feed valve unit 64 opens and frees, counter to the closed nonreturn valve 68, a flow path from the second motor working line 10 to the feed pressure line 63.

As long as the pressure in the first motor working line 9 is lower than the pressure set by the feed pressure limiting valve 66, the withdrawn pressure medium of the second motor working line 10 is supplied to the first motor working line 9. In contrast, if the pressure in the first motor working line 9 is also higher than the pressure set by the feed pressure limiting valve 66, the feed pressure limiting valve 66 opens and relieves the feed pressure line 63 and thus ultimately the second motor working line 10 to the tank volume 60.

The invention is not limited to the exemplary embodiment illustrated. In particular, individual features which have already been explained in the description may be combined with one another. For instance, instead of producing control signals both for the flow divider 80 and for the pressure limiting valve 23, it is also conceivable to design only the flow divider 80 or the pressure limiting valve 23 to be controllable. Furthermore, a direct connection between the electronic control device 35 and the controlling valve may also be provided. A bus system 34 is not required

The invention claimed is:

1. A hydrostatic travel drive having a hydraulic pump unit, at least one first hydraulic motor unit and at least one second hydraulic motor unit, which are connected in parallel to the hydraulic pump unit in a closed hydraulic circuit, a flow divider being arranged between the hydraulic motor units and the hydraulic pump unit,
    wherein a pressure limiting valve is connected to a first working line, which connects the flow divider to the hydraulic pump unit, and wherein an opening pressure of the pressure limiting valve is adjustable in dependence on a control signal.

2. The hydrostatic travel drive according to claim 1, wherein the pressure limiting valve is arranged in a short-circuit line, which connects the first working line to a second working line.

3. The hydrostatic travel drive according to claim 2, wherein a nonreturn valve is arranged between the pressure limiting valve and the second working line and opens in the direction of the second working line.

4. The hydrostatic travel drive according to claim 1, wherein the flow divider connects a first motor working line branch and a second motor working line branch to the first working line via in each case one controllable throttling point.

5. The hydrostatic travel drive according to claim 4, wherein the throttling points of the flow divider are adjustable in their throttling effect in dependence on a further control signal.

6. The hydrostatic travel drive according to claim 1, wherein the hydraulic pump unit is adjustable in its delivery volume, the delivery volume being adjustable in the direction of a minimum delivery volume in dependence on a braking signal.

7. The hydrostatic travel drive according to claim 6, wherein the delivery volume of the hydraulic pump unit is adjustable by an adjusting device which is controllable by an electronic control device.

8. The hydrostatic travel drive according to claim 1, wherein the first hydraulic motor unit and the second hydraulic motor unit are adjustable in their absorbing volume via a first motor adjusting device and a second motor adjusting device, respectively, the first motor adjusting device and the second motor adjusting device being controllable by an electronic control device.

9. The hydrostatic travel drive according to claim 1, wherein a purge device is connected to the first working line between the connection of the pressure limiting valve to the first working line and the hydraulic pump unit.

* * * * *